Sept. 13, 1938.    H. C. HUEGLIN    2,129,933
MOUNTING FOR AIR CIRCULATOR DEVICES
Filed Nov. 13, 1936
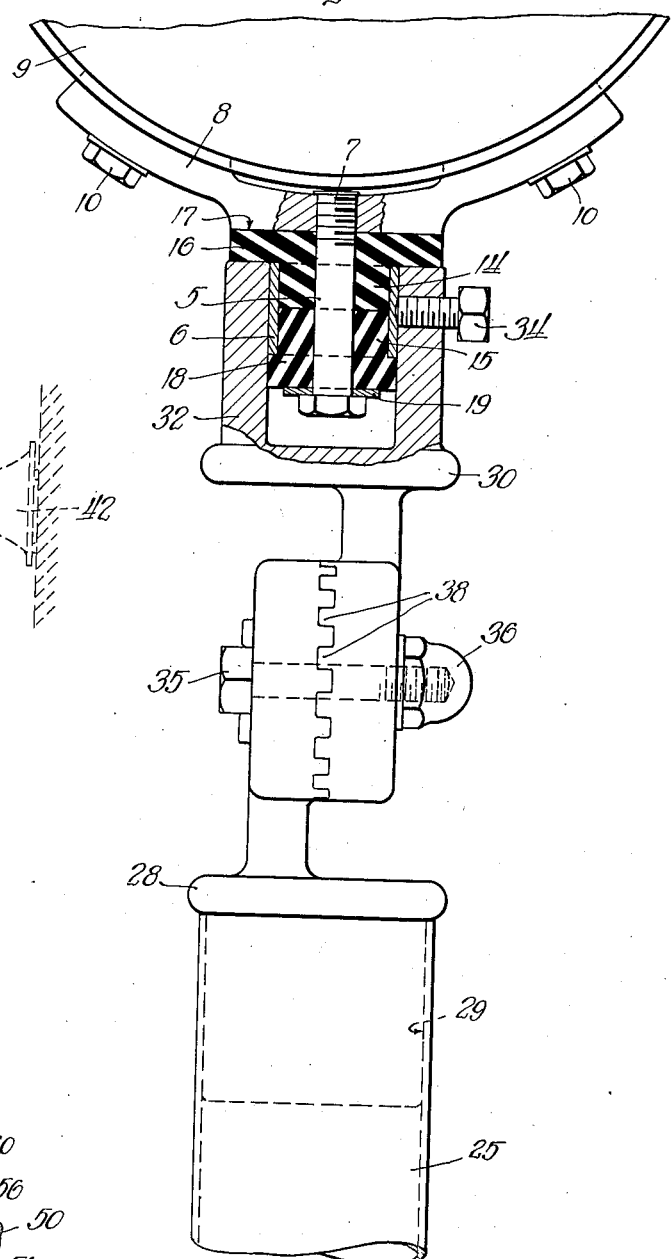
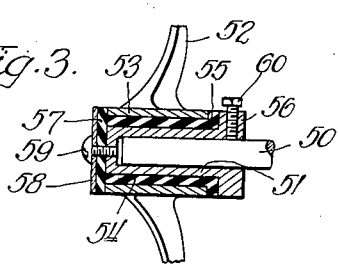
Inventor
Herman C. Hueglin.
By Brown, Jackson, Boettcher & Dienner
Attys Patented Sept. 13, 1938

2,129,933

UNITED STATES PATENT OFFICE 2,129,933

MOUNTING FOR AIR CIRCULATOR DEVICES

Herman C. Hueglin, Chicago, Ill., assignor to Airmaster Corporation, Chicago, Ill., a corporation of Illinois Application November 13, 1936, Serial No. 110,623

9 Claims. (Cl. 230—232)

The invention relates to air circulator devices and has to do with improved mounting means for devices of this sort and, particularly, with improved mounting means for the motors and fans of such devices.

One of the main objects of the invention is to provide an improved mounting means which will dampen vibration and insure smooth and quiet operation of devices of this sort.

It is also an object to provide an improved mounting which will produce the results above set forth and which, at the same time, is of simple and inexpensive construction, easily assembled and dismantled for replacement of the mounting means, or for any purpose, and with which, when assembled, the parts are firmly secured together and, at the same time, in a yielding manner for the purposes set forth.

According to one embodiment of the invention, I adapt the same for mounting the motor of the air circulator device upon the upright supporting pedestal or other support and thereby dampen vibration, insure smooth operation, and eliminate noise between the motor and the pedestal or other support, or at the mounting of the motor upon the pedestal or such other support.

According to another embodiment of the invention, I adapt the same for mounting the fan of the air circulator device upon the motor shaft or a bushing thereon, and thereby dampen vibration, insure smooth operation, and eliminate noise between the hub of the fan and the motor shaft or a bushing thereon, or at the mounting of the fan of the air circulator device upon the motor shaft or bushing.

In each embodiment of the invention selected for illustration, the vibration dampening and noise eliminating mounting comprises separately formed yielding bushing means that are adapted to be disposed between the parts between which the transmission of vibration and noise is to be eliminated, such bushing means being expanded to bind such parts together firmly, yet yieldingly, for the purpose described. By providing such separate yielding bushing means dissembly of the parts and replacement of the mounting means can be easily and quickly accomplished, and the binding together of the several parts of the mounting means is obtained by the expansion of the bushing means.

Further objects and advantages of the invention will appear from the following detailed description, taken in connection with the accompanying drawing, in which:

Figure 1 is a fragmentary detail view, partially in section and partially in elevation, showing one embodiment of the present invention;

Figure 2 is a view showing different forms of supports for the air circulator device and the manner in which the motor is mounted upon such supports by the mounting means of the present invention; and Figure 3 is a fragmentary detail section showing another embodiment of the invention wherein the mounting means is employed for mounting the fan of the air circulator device upon the motor shaft or a bushing thereon.

Referring first to the embodiment of the invention shown in Figures 1 and 2 of the drawing, the mounting means therein illustrated comprises a sleeve member 5 and a member 6 disposed within said sleeve member.

The member 6 is in the form of a bolt having threaded engagement at 7 with a bracket 8. The bracket 8 is curved to conform to the curvature of the housing of the motor 9, and is bolted thereto at 10, 10. The fan 11 is fixed upon and driven by the shaft 12 of the motor 9 and may be provided with a suitable guard 13.

Yielding bushing means is disposed between the sleeve memer 5 and the bolt 6. This bushing means comprises a pair of separate bushing members 14 and 15, preferably formed of rubber or other suitable yielding material. The bushing 14 has an integral flange 16 which extends out laterally between the flat surface 17 of the bracket 8 and the adjacent end of the sleeve member 5. The bushing 15 is flanged out at 18 over the opposite end of the sleeve member 5. A washer 19 is disposed between the head of the bolt 6 and the adjacent end of the bushing member 15, and the bolt 6, upon being threaded into the bracket 8, acts through the washer 19 to compress the bushing members 14 and 15 axially, thereby expanding these bushing members laterally into firm yielding engagement with the sleeve member 5 and the bolt 6 to bind said members firmly and yieldingly together.

It will be seen from the above that by providing the separately preformed and yielding bushing members, I have provided a mounting that is not only of simple and inexpensive construction, but which can be easily assembled and dismantled for replacement of the mounting means, or for any other purpose, and with which, when assembled, the parts are firmly secured together and, at the same time, in a yielding manner for the purposes set forth.

The support may be in the form of an upright floor pedestal comprising telescoping tubular sections 25 and 26, the lower section 26 being provided with a suitable base 27. The fitting 28 has a portion 29 which has pressed fit or is otherwise suitably secured in the upper end of the tubular section 25 of the supporting pedestal. The fitting 30 has the tubular portion 32 which fits telescopically over the sleeve 5, bolt 6, and bushing assembly, and, at its upper end, seats against the yielding flange 16 of the bushing member 14 and supports the motor and associated air circulator assembly therethrough. The tubular portion 32 of the fitting 30 is firmly secured to the sleeve member 5 by means of a set bolt 34. By providing the telescopic connection between the sleeve 5 and the member 32 of the support the motor housing can be rotated relative to the support by merely loosening the set bolt 34 to permit such rotation, and when the motor has been moved to the desired position it is held in such position by again tightening the set bolt.

The fittings 28 and 30 are pivotally connected by a bolt 35 which has threaded engagement with a suitable nut 36, and the pivotally connected portions of the fittings have teeth or serrations 38 for positively holding the fitting 30 and thereby the air circulator device supported thereby in the different angular positions into which the same may be moved about the axis of the bolt 35.

In Figure 2 I have shown a shelf base support at 40 for supporting the air circulator device, the tubular pedestal part in such case being of considerably reduced length. One manner in which the device may be mounted upon a wall or the like is shown in dotted lines at 42 in Figure 2, the mounting means of the present invention being incorporated in the manner above set forth with each of said different mountings.

In the embodiment of the invention shown in Figure 3, I adapt the invention for mounting the fan of the air circulator device upon the motor shaft, or a bushing thereon, and thereby dampen vibration, insure quiet operation, and eliminate noise at the mounting of the fan on the motor shaft.

In this embodiment, the motor shaft indicated at 50 is provided with a brass or other suitable bushing 51, and the fan 52 has an integral aluminum blade hub 53 disposed over the bushing 51. The yielding bushing means comprises a bushing member 54, preferably formed of rubber or other suitable yielding material and disposed between the bushing 51 and the hub 53 of the fan. The bushing 54 has an integral flange 55 which extends out laterally between the laterally extending portion or flange 56 of the bushing 51 and the adjacent end of the fan hub 53. A yielding washer 57, also preferably formed of rubber or other suitable yielding material, is disposed between the opposite end of the fan hub 53 and a metal washer 58, and a screw 59 threaded into the end of the bushing 51 clamps the parts together and compresses the washer 57, bushing 54, and flange 55 axially, thereby expanding the bushing means laterally into firm yielding engagement with the bushing 51 and fan hub 53 to bind these parts yieldingly and, at the same time, firmly together for rotation of the fan as a unit with the shaft 50, the bushing 51 being secured to this shaft by means of a set bolt 60.

I do not intend to be limited to the precise details shown and described.

I claim:

1. In a sound preventing mounting for fans, in combination, an inner member, an outer member surrounding said inner member and generaly concentric therewith, an intermediate sleeve member surrounding said inner member and in turn surrounded by said outer member, a fan part carried by one of said first two members, yielding bushing means between the member carrying said fan part and said sleeve member and constituting the sole means for maintaining said members in concentric relation, means constituting a unitary part of said mounting for compressing said bushing means axially to expand same laterally into firm engagement with said sleeve member and the member carrying said fan part to bind said members firmly and yieldingly together and against relative rotation independently of vulcanization of said yielding bushing means to the member carrying said fan part or to said sleeve member, and means for locking said sleeve member to the other of said first two members.

2. In a device of the class described, a motor shaft, a rigid bushing fixed upon said shaft, a fan having a blade hub disposed about said bushing, and yielding bushing means disposed between said rigid bushing and said blade hub and compressed axially and thereby expanded laterally into firm engagement with said rigid bushing and said blade hub to bind said fan firmly and yieldingly to said rigid bushing for rotation with said motor shaft solely by lateral expansion of said yielding bushing means by axial compression thereof and independently of vulcanization of said yielding bushing means to the blade hub or rigid bushing.

3. In a device of the class described, a motor shaft, a rigid bushing fixed upon said shaft, a fan having a blade hub disposed about said bushing, yielding bushing means disposed between said rigid bushing and said blade hub and compressed axially and thereby expanded laterally into firm engagement with said rigid bushing and said blade hub to bind said fan firmly and yieldingly to said rigid bushing for rotation with said motor shaft solely by lateral expansion of said yielding bushing means by axial compression thereof and independently of vulcanization of said bushing means to the blade hub or rigid bushing, a laterally extending part on said rigid bushing, yielding means extending laterally between said laterally extending part and one end of said blade hub, clamping means at the opposite end of the blade hub, and yielding means extending laterally between said clamping means and the other end of the blade hub.

4. In a device of the class described, a motor shaft, a rigid bushing fixed upon said shaft, a fan having a blade hub disposed about said bushing, yielding bushing means disposed between said rigid bushing and said blade hub, and means having screw threaded connection with said rigid bushing for axially compressing said yielding bushing means to expand the same laterally into firm engagement with said rigid bushing and said blade hub to bind said fan firmly and yieldingly to said rigid bushing for rotation with said motor shaft solely by lateral expansion of said yielding bushing means by axial compression thereof and independently of vulcanization of said bushing means to the blade hub or rigid bushing.

5. In a device of the class described, a motor shaft, a rigid bushing fixed upon said shaft, a fan having a blade hub disposed about said bushing, yielding bushing means disposed between said rigid bushing and said blade hub, and means connected with said rigid bushing and movable relative thereto for axially compressing said yielding bushing means to expand the same laterally into firm engagement with said rigid bushing and said blade hub to bind said fan firmly and yieldingly to said rigid bushing for rotation with said motor shaft solely by lateral expansion of said yielding bushing means by axial compression thereof and independently of vulcanization of said bushing means to the blade hub or rigid bushing.

6. In a device of the class described, a motor shaft, a rigid bushing fixed upon said shaft, a fan having a blade hub disposed about said bushing, yielding bushing means disposed between said rigid bushing and said blade hub, a laterally extending part at one end of said rigid bushing, yielding means extending laterally between said laterally extending part and one end of said blade hub, and clamping means at the opposite end of said rigid bushing for axially compressing said yielding bushing means to expand the latter into firm engagement with said rigid bushing and said blade hub and to press said laterally extending yielding means into firm engagement with said laterally extending part of said rigid bushing so constructed and arranged that said blade hub will rotate with said motor shaft, said clamping means being detachably connected with said rigid bushing and said bushing means being otherwise free of said rigid bushing and said blade hub to provide for removal of said blade hub and bushing means from said rigid bushing.

7. In a device of the class described, a motor having a housing, a support, a stud secured to said motor housing, a sleeve member disposed about said stud, yielding bushing means disposed between said sleeve member and said stud, means compressing said bushing means axially to expand the same laterally into firm engagement with said sleeve member and said stud to bind said members firmly and yielding together and against relative rotation solely by lateral expansion of the yielding bushing means by compression thereof and independently of vulcanization of said bushing means to said stud or sleeve member, a fitting connected to said support and having a tubular part fitting telescopically over said sleeve member in such manner that said sleeve member may be rotated relative to said support to adjust said housing on said support, and means on the tubular part of the fitting and engaging said sleeve member for locking the sleeve member to the fitting in any adjusted position of said housing.

8. In a device of the class described, a motor having a housing, a support, a stud secured to said motor housing, a sleeve member disposed about said stud, yielding bushing means disposed between said sleeve member and said stud, means compressing said bushing means axially to expand the same laterally into firm engagement with said sleeve member and said stud to bind said members firmly and yieldingly together and against relative rotation solely by lateral expansion of the bushing means by compression thereof and independently of vulcanization of said bushing means to said stud or sleeve member, a fitting connected to said support and having a tubular part fitting telescopically over said sleeve member in such manner that said sleeve member may be rotated relative to said support to adjust said housing on said support, means on the tubular part of the fitting and engageable with said sleeve member for locking the sleeve member to the fitting in any adjusted position of said housing, and yielding means extending laterally between the motor housing and one end of said sleeve member and at the opposite end of said sleeve member.

9. In a device of the class described, a motor having a housing, a support, a stud secured at one end to the motor housing and having abutment means at the other end, a sleeve member disposed about said stud, yielding bushing means disposed laterally between said sleeve member and said stud and endwise between the motor housing and said abutment means and compressed axially into firm laterally expanded engagement with said sleeve member and said stud to bind said members firmly and yieldingly together and against relative rotation solely by the lateral expansion of the yielding bushing means and independently of vulcanization of said bushing means to said stud or sleeve member, a fitting on said support and having a tubular sleeve part fitting telescopically over said sleeve member in such manner that said sleeve member may be rotated relative to said support to adjust said housing on said support, and means for locking said sleeve member to the fitting in different adjusted positions of said housing.

HERMAN C. HUEGLIN.